US005511283A

United States Patent [19]
Hirose

[11] Patent Number: 5,511,283
[45] Date of Patent: Apr. 30, 1996

[54] MATCLIP

[75] Inventor: Akihiko Hirose, Zama, Japan

[73] Assignee: Illinois Tool Works Inc., Glenview, Ill.

[21] Appl. No.: 348,936

[22] Filed: Nov. 25, 1994

[30] Foreign Application Priority Data

Dec. 3, 1993 [JP] Japan .................. 5-064831 U

[51] Int. Cl.$^6$ .................................. A47G 27/04
[52] U.S. Cl. ...................................... 16/8; 411/508
[58] Field of Search ................... 16/4, 8; 411/34, 411/44, 508; 24/297, 453

[56] References Cited

U.S. PATENT DOCUMENTS

| 1,840,272 | 1/1952 | Fenton et al. ................ 16/4 |
| 4,285,103 | 8/1981 | Inamoto ..................... 411/508 |
| 4,829,627 | 5/1989 | Altus et al. ................... 16/8 |
| 4,920,618 | 5/1990 | Iguchi ....................... 411/508 |
| 4,929,487 | 5/1990 | Tilman et al. ................. 24/297 |

*Primary Examiner*—Maurina T. Rachuba
*Assistant Examiner*—Donald M. Gurley
*Attorney, Agent, or Firm*—Schwartz & Weinrieb

[57] ABSTRACT

A matclip for easily securing a floor carpet and for preventing displacement of a floor mat which is laid on the floor carpet. The matclip is comprised of a base plate mounted on a floor carpet laid on a vehicle floor panel; a foldable leg which extends from a lower surface of the base plate and which is inserted into a through-hole defined in the floor carpet so as to easily secure the matclip to the floor carpet; a connecting plate provided at the lower end of the leg; a projection extending vertically upwardly toward the base plate from the connecting plate; a pair of engaging devices provided at a base portion of the leg for engaging the projection when the leg is folded; and a cylindrical engaging column extending vertically provided upwardly from an upper surface of the base plate and fixedly engaging a hole of the floor mat to prevent displacement thereof.

18 Claims, 7 Drawing Sheets

MATCLIP

BACKGROUND OF THE INVENTION

1. Field of the Invention

The present invention relates to a matclip for fixing a floor mat onto a floor carpet laid on a vehicle floor panel.

2. Description of the Related Art

A floor carpet is laid on a vehicle floor panel. A floor mat can be arbitrarily placed on the floor carpet and fixed thereto by a matclip.

As shown in FIGS. 6 and 7, a conventional matclip 60 comprises a female clip 62 placed on the reverse side of or beneath a floor carpet 14 which has a through-hole 54, a male clip 64 inserted into the through-hole 54 from the upper surface of the floor carpet 14 so as to be coupled to the female clip 62, and a mat stopper 68 having a leg member 66 engageable with the male clip 64.

The front and back surfaces of the floor carpet 14 are clamped by the female and male clips 62 and 64. The leg member 66 is inserted into a fitting hole 70 defined in the male clip 64 so that the mat stopper 68 having a vertically extending engaging pin 72 provided thereon is secured to the floor carpet 14. A floor mat 76 is disposed on the carpet 14, and a hole 24 of the floor mat 76 engages the engaging pin 72.

However, in accordance with the above-described structure, much labor is required since the female and male clips 62 and 64 must be mounted to the floor carpet 14 by turning over the floor carpet 14 and inserting a connecting cylinder 74 of the female clip 62 into the through-hole 54 from the reverse side of the floor carpet 14.

Further, since the conventional matclip 60 is made up of three components, portions of such components that are connected to one another rattle and rotate. Therefore, the mat stopper 68 is rotated about the connecting portions with the leg member 66 as the center of rotation, so that the floor mat 76 is often displaced.

OBJECT OF THE INVENTION

With the foregoing in view, it is an object of the present invention to provide a matclip which is easily secured to a floor carpet and prevents displacement of a floor mat which is secured to the floor carpet.

SUMMARY OF THE INVENTION

According to a first aspect of the present invention, for achieving the above object, there is provided a matclip comprising a base plate being mountable on a floor carpet laid on a vehicle floor panel; a leg including at least one pair of leg members which extend from a lower surface of the base plate and which are insertable into a through-hole defined in the floor carpet and which are bendable by intermediate portions thereof being bent in directions in which the leg members move apart from each other; a connecting plate for connecting tip portions of the leg members to each other; a projection provided on the connecting plate and extending toward the base plate; engaging means provided at a base portion of each leg member, for engaging the projection in a state in which the leg members are folded; and an engaging column provided on an upper surface of the base plate and having an elastic pawl formed on an outer peripheral surface thereof.

According to a second aspect of the present invention, the matclip preferably has a plurality of first wedges provided on a lower surface of the base plate and a plurality of second wedges which protrude from outer side surfaces of the pair of leg members.

With regard to the first aspect of the present invention, the floor carpet is first slightly lifted and the pair of leg members is inserted into the through-hole from the front surface of the floor carpet. When the base plate is then pressed against the floor panel, the connecting plate is brought into contact with the floor panel so that the intermediate portions of the pair of leg members are folded in the directions in which the intermediate portions thereof are separated from each other. Thus, the pair of leg members are expanded radially outwardly such that the external diameter thereof is greater than the internal diameter of the through-hole. At this time, the projection that extends from the connecting plate is engaged in the engaging means provided at the base portions of the pair of leg members and the pair of leg members are held in a state in which the pair of leg members have been folded. Thus, the matclip is mounted on the floor carpet from the front surface of the floor carpet. Further, since the matclip is formed by a single component, the base plate is not rotated. Moreover, the base plate is no longer rotated about the connecting portions as in the conventional matclip.

Thus, when the hole defined in the floor mat is fitted on the cylindrical engaging column extending vertically upwardly from the upper surface of the base plate secured on the floor carpet, the elastic pawl is elastically deformed so that the hole of the floor mat can be fitted on the cylindrical engaging column. Thereafter, the elastic pawl is elastically restored such that a peripheral edge of the hole engages with the cylindrical engaging column. As a result, the floor mat is fixedly mounted on the matclip.

With regard to the second aspect of the present invention as well, the second wedges which protrude from the outer side surfaces of the pair of legs and the first wedges which project from the reverse side of the base plate, are respectively engaged in the reverse and front surfaces of the floor carpet in a state in which the pair of legs has been folded. Therefore, the base plate is securely fixed to the floor carpet.

Since the matclip according to the present invention is constructed in the above-described manner, the matclip can be easily mounted on the floor carpet and the floor mat can be prevented from shifting.

BRIEF DESCRIPTION OF THE DRAWINGS

Further objects and many of the attendant advantages of the present invention will be readily appreciated as the same becomes better understood by reference to the following description when read in conjunction with the accompanying drawings in which like reference characters designate like or corresponding parts throughout the several views, and wherein.

DETAILED DESCRIPTION OF THE PREFERRED EMBODIMENT

Figure 1:
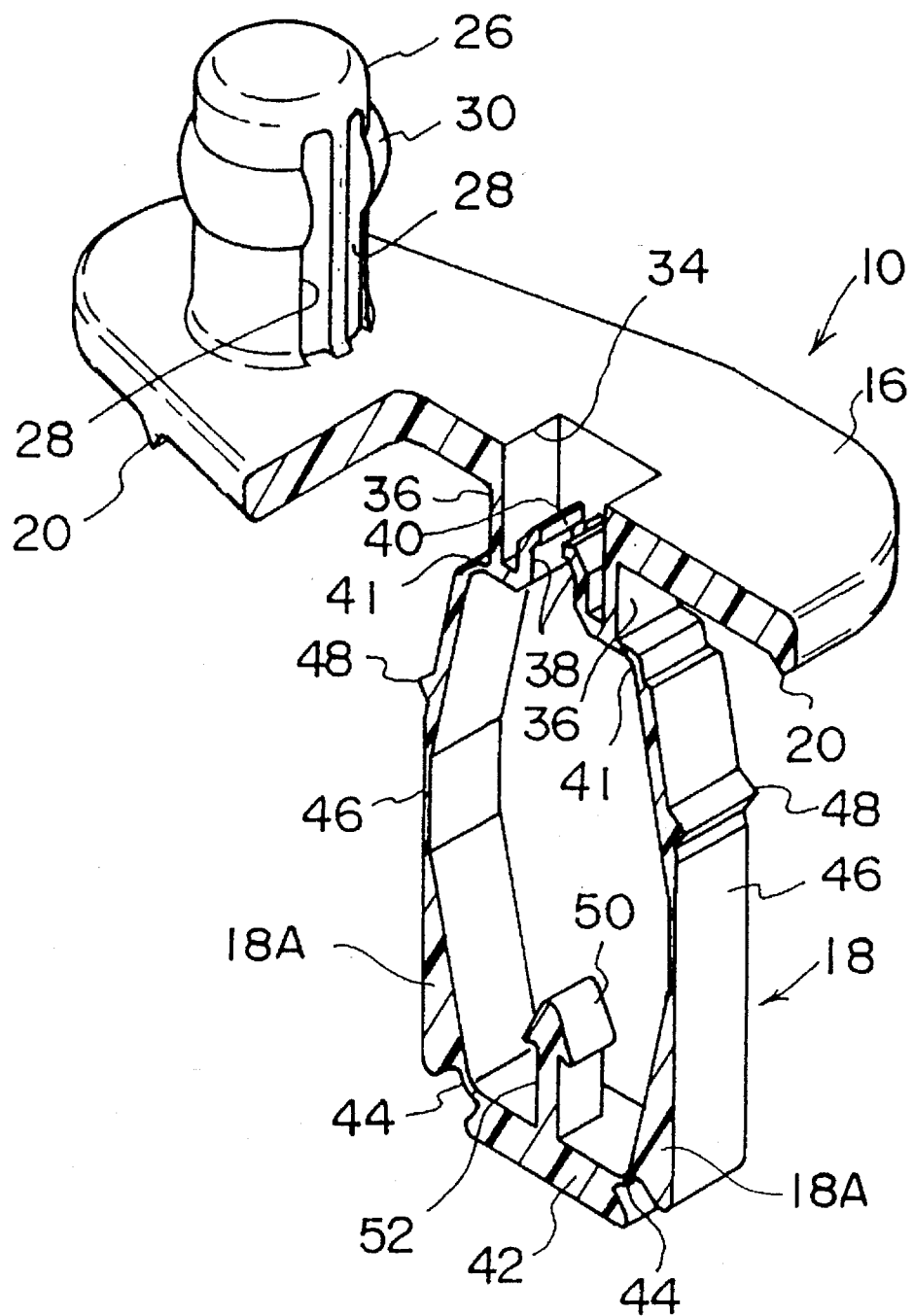
FIG. 1 is a partially sectional perspective view of a matclip of an embodiment according to the present invention showing a state in which the pair of leg members is extended.
Figure 2:
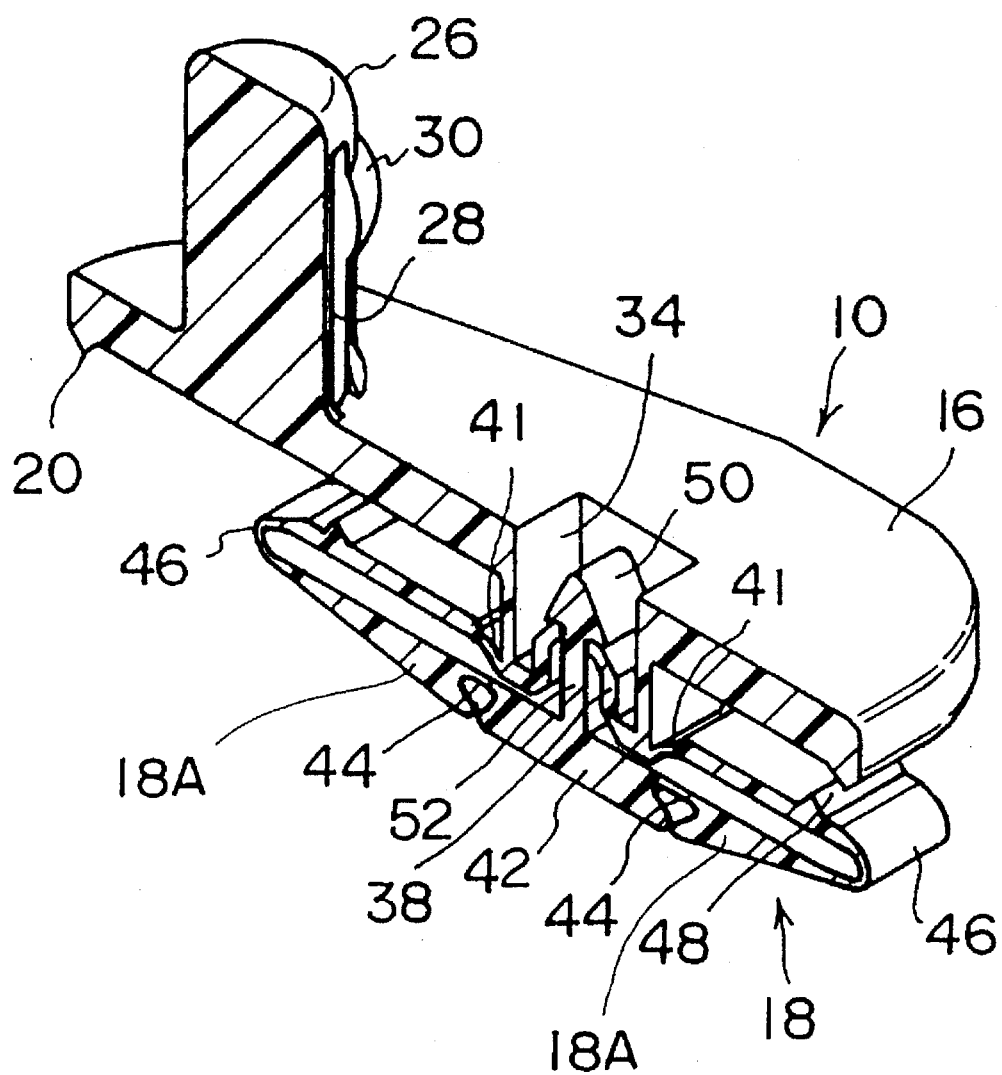
FIG. 2 is a partially sectional perspective view of the matclip of the present invention showing a state in which the pair of leg members is folded.
Figure 3:
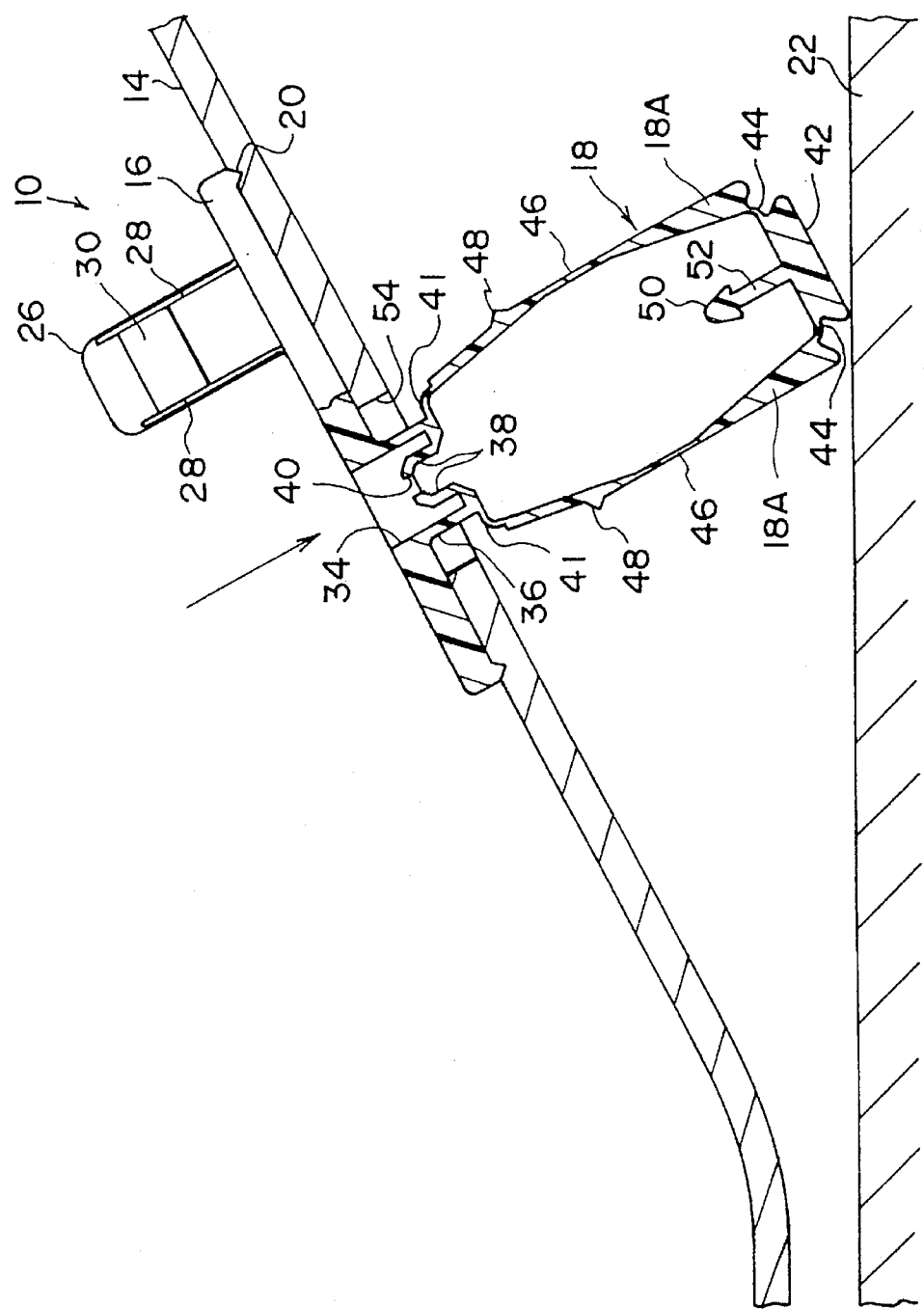
FIG. 3 is a cross-sectional view illustrating a process of securing the matclip of the present invention to the floor carpet.

A preferred embodiment of the present invention will hereinafter be described with reference to the accompanying drawings.

As shown in FIGS. 1 through 5, a matclip 10 according to an embodiment of the present invention is comprised of a base plate 16 held between a floor mat 12 and a floor carpet 14, and a leg 18 which is comprised of a pair of leg members 18A and which projects from a lower surface of the base plate 16. The base plate 16 and the leg 18 are integrally formed.

A plurality of wedges 20 which have pointed tip portions are provided upon the base plate 16 so as to project from the lower surface of the base plate 16 so as to be engaged in the front surface of a floor carpet 14 laid on a floor panel 22. Further, a cylindrical engaging column 26 is provided on an upper surface of the base plate 16 and is fixedly inserted into a mounting hole 24 formed in a floor mat 12.

Two elongated holes 28 which are formed through the cylindrical engaging column 26 in the radial direction thereof, are provided so as to extend over an outer peripheral surface of the cylindrical engaging column 26 along the axial direction thereof. Due to the elongated holes 28, the diameter of the cylindrical engaging column 26 can be reduced by radially compressing the cylindrical engaging column 26. A pawl 30 projects from an upper outer peripheral surface of the cylindrical engaging column 26 so as to extend circumferentially around the barrel of the cylindrical engaging column 26. The pawl 30 serves to engage a ring 32 provided for reinforcing the peripheral edge of the mounting hole 24 of the floor mat 24.

Figure 4:
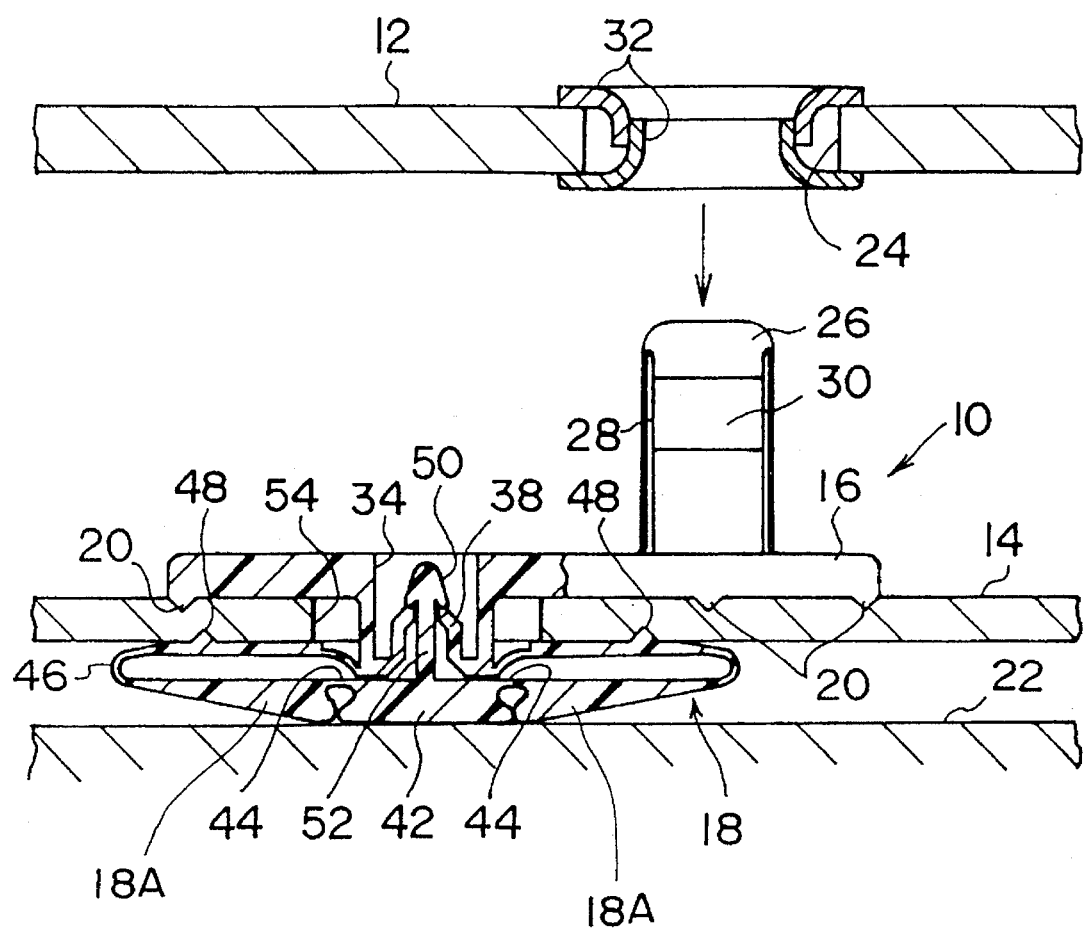
FIG. 4 is a cross-sectional view illustrating a state in which the matclip of the present invention is mounted on a floor carpet.
Figure 5:
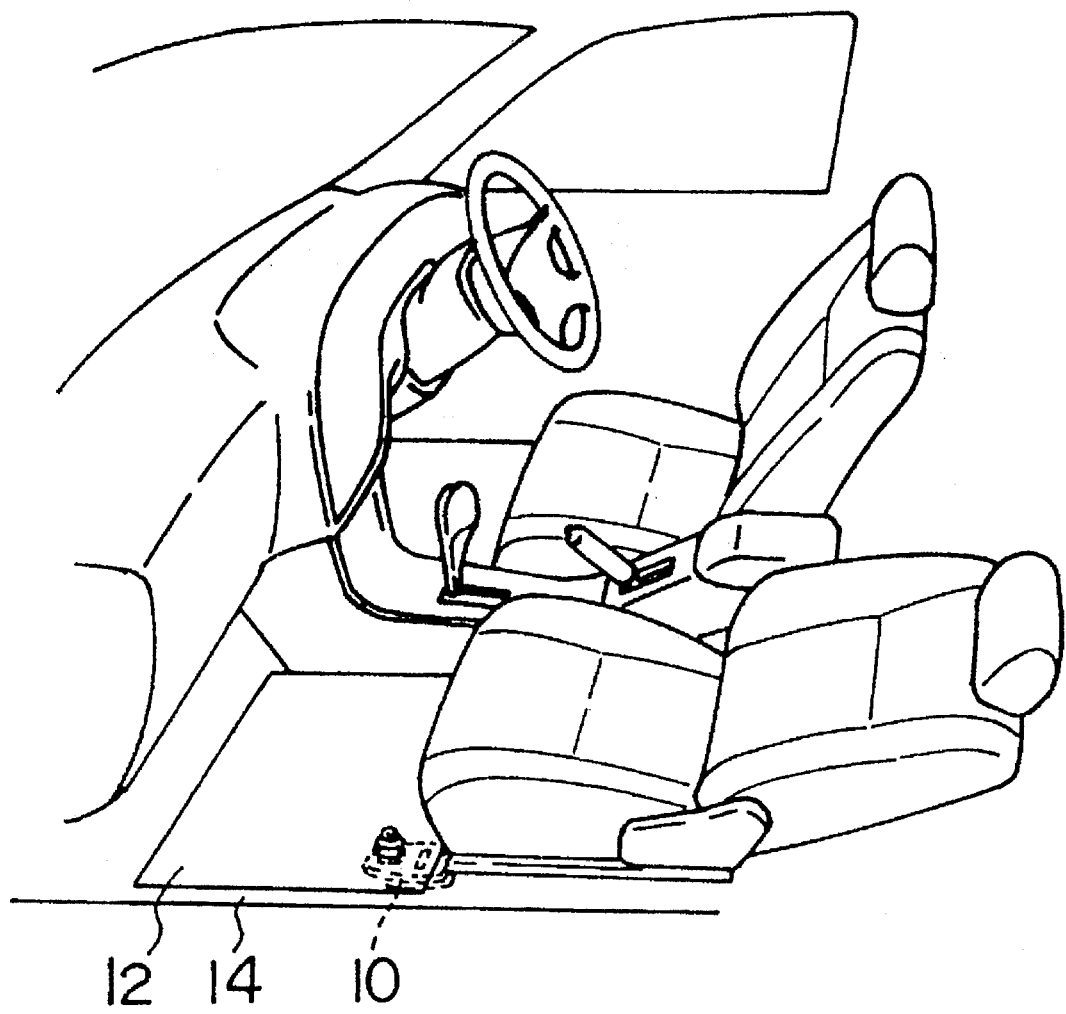
FIG. 5 is a schematic view showing a state in which the matclip of the present invention is engaged with a floor mat.
Figure 6:
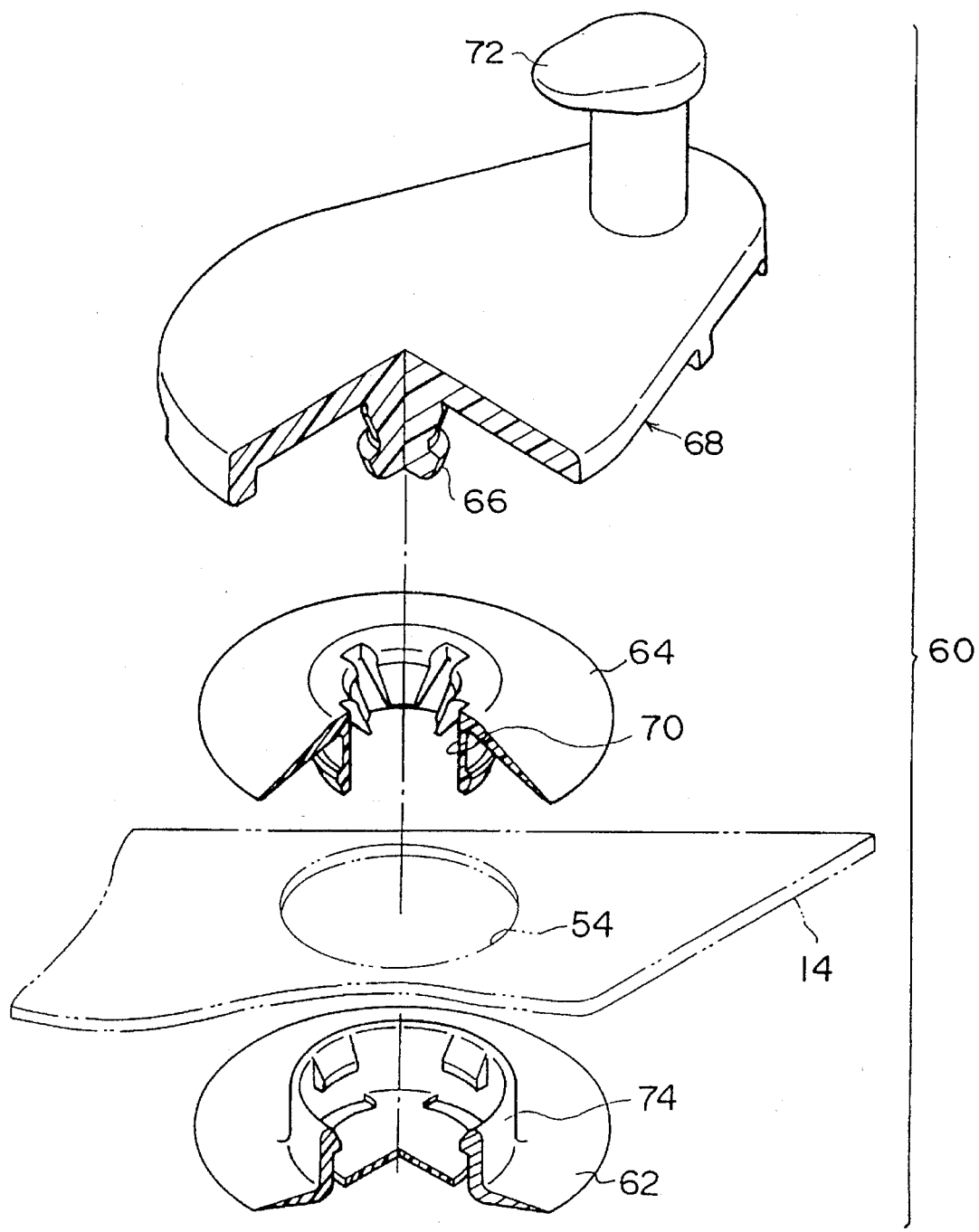
FIG. 6 is an exploded perspective view illustrating a conventional matclip.

A rectangular aperture 34 is defined in the base plate 16. Opposite wall bodies 36 are provided so as to extend under the lower surface of the base plate 16 from edge portions of the aperture 34. Further, elastic members 38 extend oppositely toward the center of the aperture 34 and toward the base plate 16 from respective lower ends of the opposite wall bodies 36. A slot or hole 40 is defined between the free ends of the elastic members 38. A pair of long plate-like leg members 18A project respectively from outer surfaces of the lower ends of the wall bodies 36 to form the leg 18 of the base plate 16. Portions where the leg 18 is joined to the wall bodies 36 are formed as thin-wall hinges 41. Similarly, portions where the leg 18 is joined to a connecting plate 42, which is provided to connect both of the lower end portions of the leg members 18 to each other, are also formed as thin-wall hinges 44. Further, intermediate portions of the leg members 18A are formed as thin-wall portions 46. The leg 18 can be bent about the thin-wall hinges 41, 44 and the thin-wall portions 46. Further, the wedges 48 project above the thin-wall portions 46 so as to be engaged in the reverse surface of the floor carpet 14 as shown in FIG. 4.

A projection 52 having a large-diameter portion 50 formed in a tip portion thereof, is vertically disposed on the upper surface of the connecting plate 42. The large-diameter portion 50 of the projection 52 is inserted into the hole 40 when the leg 18 is folded.

Operation of the matclip according to the present embodiment will be described below.

The floor carpet 14 is first slightly lifted and the extended leg 18 is inserted into a through hole 54 of the floor carpet 14 from the direction of the front surface. Subsequently, when the base plate 16 is pressed against the floor panel 22, the connecting plate 42 is brought into contact with the floor panel 22 so that the thin-wall hinges 41, 44 and the thin-wall portions 46 of the leg members 18A are bent. Thus, the thin-wall portions 46 are respectively displaced in directions in which they are separated from each other, so that the leg members 18A are spread so as to have a diameter which is greater than the internal diameter of the through hole 54.

The large-diameter portion 50 of the projection 52 provided upright from the connecting plate 42 extends through the hole 40 while spreading the elastic members 38 so that the large-diameter portion 50 is engaged with the free ends of the elastic members 38 which have been elastically restored.

Thus, the matclip 10 according to the present embodiment can be easily mounted to the floor carpet 14 from the front surface of the floor carpet 14.

Since the wedges 48 protruding from the outer surfaces of the leg members 18A and the wedges 20 provided on the lower surface of the base plate 16 are respectively engaged in the reverse and front surfaces of the floor carpet 14 when the leg members 18A are folded, the base plate 16 does not rotate. Further, since the matclip 10 is made up of a single component, there is no play between the connecting portions as in the prior art.

Figure 7:
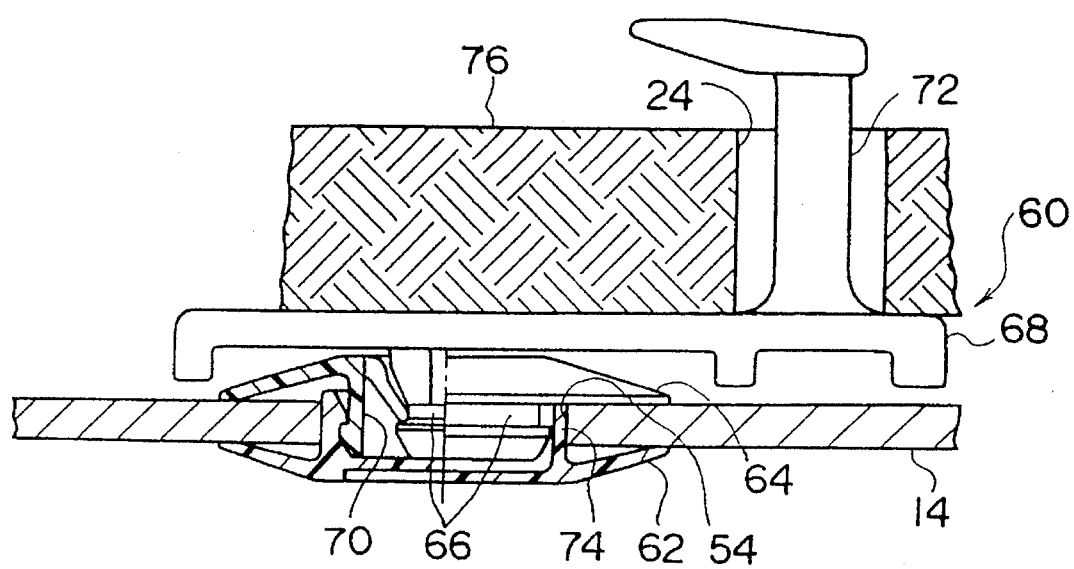
FIG. 7 is a cross-sectional view showing a state in which the conventional matclip is mounted upon the floor carpet and engaged by the floor mat.

Thus, when the mounting hole 24 defined in the floor mat 12 is inserted over the cylindrical engaging column 26 of the matclip 10 mounted on the floor carpet 14, the pawl 30 is elastically deformed to allow the cylindrical engaging column 26 to pass through the mounting hole 24. Thereafter, the pawl 30 is elastically restored and engages the ring 32 disposed within the mounting hole 24 and through which the cylindrical engaging column 26 extends. It is therefore unnecessary to squeeze the cylindrical engaging column 26 into the mounting hole 24 by twisting the floor mat 12 as in the case of an engaging pin 72 having an L-shaped head shown in FIG. 7. Further, an occupant does not trip on the head of the engaging pin 72.

The matclip of the invention is easily secured to a floor carpet and prevents displacement of a floor mat which is secured on the floor carpet.

Having now fully described the invention, it will be apparent to those skilled in the art that many changes and modifications can be made without departing from the spirit or scope as set forth herein. It is therefore to be understood that within the scope of the appended claims, the present invention may be practiced otherwise than as specifically described herein.

What is claimed is:

1. A matclip for securing a floor mat to a floor carpet within an automotive vehicle, comprising:

a base plate disposed atop a floor carpet laid upon a vehicle floor panel, said floor carpet having a through-hole extending therethrough;

a leg, including at least one pair of leg members connected at first end portions thereof to, and which extend downwardly from, a lower surface of said base plate so as to be insertable through said through-hole defined within said floor carpet, and having means defined thereon for permitting said at least one pair of leg members to be foldable at intermediate portions thereof such that said intermediate portions of said at least one pair of leg members can move apart from each other;

a connecting plate for connecting second end portions of said leg members, disposed opposite said first end portions thereof connected to said base plate, to each other;

first engaging means disposed upon said connecting plate and extending toward said base plate;

second engaging means disposed upon said leg for engaging said first engaging means of said connecting plate when said connecting plate is moved toward said base plate and said intermediate portions of said leg members are folded and moved apart with respect to each other; and a column mounted upon an upper surface of said base plate for insertion through an aperture of a floor mat to be secured to said floor carpet.

2. The matclip as claimed in claim 1, further comprising:

a plurality of first wedges provided upon said lower surface of said base plate for engaging an upper surface of said floor carpet; and a plurality of second wedges provided upon outer surface portions of said leg members for engaging a lower surface of said floor carpet when said intermediate portions of said leg members are folded.

3. The matclip as claimed in claim 1, wherein portions where said leg members and said base plate are joined to one another, and the intermediate portions of said leg members, are respectively formed as bendable thin-wall portions.

4. The matclip as claimed in claim 1, wherein portions where said connecting plate and said leg members are joined to each other are respectively formed as thin-wall hinges.

5. The matclip as claimed in claim 1, wherein said first engaging means has a large-diameter portion at a tip portion thereof.

6. The matclip as claimed in claim 1, wherein:

said base plate comprises dependent wall bodies extending downwardly from edge portions of an aperture defined within said base plate;

said leg members are attached to lower end portions of said dependent wall bodies; and said second engaging means comprise elasic members which are mounted upon said lower end portions of said wall bodies so as to extend at inclined angles toward each other and the center of said aperture defined within said base plate.

7. The matclip as claimed in claim 1, wherein said column has two elongated holes which are defined within outer peripheral portions of said column along the axial direction thereof and which penetrate through said column in the radial direction thereof such that said column is expandable and contractible.

8. The matclip as claimed in claim 1, wherein said first engaging means provided on said connecting plate is disposed perpendicular to said connecting plate.

9. The matclip as claimed in claim 1, wherein said column of said base plate is formed as a cylinder and is disposed perpendicular to said base plate.

10. A system for securing a floor mat to a floor carpet within an automotive vehicle, comprising:

a floor carpet disposed upon a vehicle floor panel and having a through-hole extending therethrough;

a base plate disposed upon an upper surface of said floor carpet;

a pair of leg members connected at first end portions thereof to, and extending downwardly from, a lower surface of said base plate so as to be insertable through said through-hole defined within said floor carpet, and having means defined thereon for permitting said pair of leg members to be folded at intermediate portions thereof such that said intermediate portions of said leg members can move apart from each other;

a connecting plate for connecting second end portions of said leg members, disposed opposite said first end portions thereof connected to said base plate, to each other;

first engaging means disposed upon said connecting plate and extending toward said base plate;

second engaging means disposed upon said leg members at said first end portions thereof for engaging said first engaging means of said connecting plate when said connecting plate is moved toward said base plate and said intermediate portions of said leg members are folded and moved apart with respect to each other whereby said floor carpet is interposed between said lower surface of said base plate and said folded intermediate portions of said leg members;

a floor mat to be secured to an upper surface of said base plate so as to be disposed upon said upper surface of said floor carpet, and having an aperture defined therethrough; and a column mounted upon said upper surface of said base plate for insertion through said aperture of said floor mat so as to secure said floor mat to said upper surface of said base plate and with respect to said upper surface of said floor carpet.

11. The system as set forth in claim 10, further comprising:

a plurality of first wedges provided upon said lower surface of said base plate for engaging said upper surface of said floor carpet; and a plurality of second wedges provided upon outer surface portions of said leg members for engaging a lower surface of said floor carpet when said intermediate portions of said leg members are folded.

12. The system as set forth in claim 10, wherein:

said leg members are connected to said base plate at first interconnecting portions;

said leg members are connected to said connecting plate at second interconnecting portions; and said first interconnecting portions, said second interconnecting portions, and said intermediate portions of said leg members all comprise thin-wall regions for permitting said intermediate portions of said leg members to be folded relative to said base plate and said connecting plate.

13. The system as set forth in claim 10, wherein:

said second engaging means of said leg members comprises a pair of laterally spaced apart flexible members; and said first engaging means comprises an upstanding projection mounted upon said connecting plate and having an enlarged tip portion for snap-engaging said flexible members.

14. The system as set forth in claim 13, further comprising:

a pair of wall bodies, defining a downwardly recessed aperture within said base plate, extending downwardly from said lower surface of said base plate; and said pair of flexible members are connected to lower end portions of said wall bodies and are disposed within said recessed aperture of said base plate such that when said enlarged tip portion of said first engaging means snap-engages said flexible members of said second engaging means, said enlarged tip portion of said first engaging means will be disposed within said recessed aperture of said base plate at a position beneath said upper surface of said base plate so as not to interfere with said floor mat mounted upon said upper surface of said base plate.

15. The system as set forth in claim 13, wherein:

said enlarged tip portion of said first engaging means has a substantially triangular cross-sectional configuration.

16. The system as set forth in claim 10, wherein:

said column comprises a substantially annular pawl member for engaging said aperture of said floor mat.

17. The system as set forth in claim 16, wherein:

said column comprises axially extending hole means defined within an outer peripheral portion thereof so as to render said column radially expandable and contractible.

18. The matclip as set forth in claim 1, wherein:

said column comprises a substantially annular pawl member for engaging said aperture of said floor mat.

* * * * *